United States Patent
Ou-Yang et al.

(10) Patent No.: US 7,742,057 B2
(45) Date of Patent: Jun. 22, 2010

(54) METHOD AND DEVICE OF OBTAINING A COLOR TEMPERATURE POINT

(75) Inventors: Mang Ou-Yang, Taipei Hsien (TW);
Shih-Wei Huang, Taipei Hsien (TW);
Jiun-Chian Liao, Taipei Hsien (TW);
Gordon Horng, Taipei Hsien (TW);
Tsang-Hsing Lee, Taipei Hsien (TW);
Yih-Shyang Chen, Taipei Hsien (TW)

(73) Assignee: Wistron Corporation, Taipei Hsien (TW)

( * ) Notice: Subject to any disclaimer, the term of this patent is extended or adjusted under 35 U.S.C. 154(b) by 563 days.

(21) Appl. No.: 11/826,423

(22) Filed: Jul. 16, 2007

(65) Prior Publication Data

US 2008/0079746 A1    Apr. 3, 2008

(30) Foreign Application Priority Data

Sep. 28, 2006    (TW) .............................. 95136097 A (51) Int. Cl.
| G09G 5/00 | (2006.01) |
| G09G 5/02 | (2006.01) |
| G09G 5/36 | (2006.01) |
| H04N 9/73 | (2006.01) |
| H04N 1/46 | (2006.01) |
| G06K 9/40 | (2006.01) |
| G06K 9/00 | (2006.01) |

(52) U.S. Cl. .................. 345/589; 345/581; 345/426; 345/428; 345/77; 348/223; 348/655; 348/687; 348/807; 382/167; 382/254; 382/274

(58) Field of Classification Search ................. 345/581, 345/426–428, 586, 589, 591, 690, 77, 84, 345/88, 606; 348/223, 227, 655, 678, 687, 348/802, 803, 807; 382/162, 167, 254, 274
See application file for complete search history.

(56) References Cited

U.S. PATENT DOCUMENTS

| 2005/0243108 | A1 | 11/2005 | Kim |
| 2007/0267983 | A1* | 11/2007 | Van De Ven et al. ......... 315/294 |
| 2008/0211828 | A1* | 9/2008 | Huh et al. .................... 345/589 |
| 2009/0174638 | A1* | 7/2009 | Brown Elliott et al. ........ 345/88 |
| 2009/0184624 | A1* | 7/2009 | Schmidt et al. .............. 313/498 |

* cited by examiner

*Primary Examiner*—Wesner Sajous
(74) *Attorney, Agent, or Firm*—Bacon & Thomas, PLLC (57) ABSTRACT

A method of obtaining a new color temperature point as applied in a color display device. The color display device has a brightest temperature point when its red, green, and blue components are all in their brightest states. The method of obtaining a new color temperature point uses a mathematical method to find the new point which substantially satisfies the specific color temperature and also causes a minimum loss in brightness.

14 Claims, 5 Drawing Sheets

METHOD AND DEVICE OF OBTAINING A COLOR TEMPERATURE POINT

BACKGROUND OF THE INVENTION

1. Field of the Invention

The present invention relates to a method for adjusting a color temperature point for a color display device, and, more particularly, to color temperature adjustment for the color display device.

2. Description of the Related Art

An ultimate goal for various display technologies is to truthfully present the captured image via the display system, which requires color temperature adjustment technology. Different light sources create different colors on objects; therefore, light changes at different locations or at different times can yield images having different color temperatures. If the display device has only a fixed color temperature output, then it will not be able to truthfully present the picture as seen by human eyes. In addition, different races tend to have different colors preferences; for example, Asians prefer warm colors, whereas Europeans prefer cold colors. Therefore, for users in different countries, some color temperature adjustments may be needed.

A prior art document "Method and device for adjusting color temperature of a color display device" (R.O.C. published patent No. 200532637) provides a method for adjusting display color temperatures, which works by setting a corresponding $(x_1, y_1)$ chroma coordinates for a target color temperature on a CIE1931 xyY chromaticity diagram, and then measuring the current color temperature of the display and converting it to a corresponding $(x_2, y_2)$ chroma coordinate. The direction of a vector R between $(x_2, y_2)$ to $(x_1, y_1)$ is then found. The standard output of red (R), green (G), and blue (R) components are adjusted according to the direction of the vector R. Finally, the color temperature of the display is re-measured to determine if the adjusted display is now close to the target color temperature so as to determine whether fine-tuning processes should be repeated. This color temperature adjustment method relies primarily on experience rather than on an accurate analysis and requires a repetitive, time-consuming adjustment process.

Another prior art document, "Liquid display color temperature automatic adjustment system and method" (R.O.C. patent No. I246319) discloses a method for adjusting a display color temperature, which involves setting predetermined x, y values for a target color temperature; measuring x, y values of the display; respectively comparing two x, y values to determine whether increasing or decreasing of the standard output of the R, G, B components is required; and repeating the measuring and adjustment processes to cause the color temperature of the display to approach the target color temperature. However, on the CIE1931 xyY chromaticity diagram, the directions from the color temperature point to R, G, B points are not parallel to the x axis or the y axis, and increasing or decreasing any standard output of the R, G, B components, both x value and y values are changed simultaneously. Therefore, this method requires repetitive measuring and comparing to approach the color temperature point, which is time consuming and does not provide accurate results.

Another prior art document, "Color correction circuit and method for a liquid display," (R.O.C. published patent No. 200521605) discloses a method that comprises: establishing a color choosing unit having a color temperature value and gamma options; storing the color choosing unit in a read-only memory (ROM) to provide a plurality of sets of color temperature value and Gamma value (a scale between brightness and grey scale) options; after the user has selected one set, calculating a corresponding correction parameter of the selected color temperature value and gamma value using functional interpolation; and loading the correction parameter into a parameter register to correct the color temperature and gamma. This method can obtain results quicker than the previous two technologies (R.O.C. patent published No. 200532637 and R.O.C. patent No. I246319), however, it does not have an algorithm firmly based on scientific theory, and the accuracy and results are not very satisfactory.

It is therefore desirable to provide a method for adjusting color temperature that mitigates and/or obviates the aforementioned problems.

SUMMARY OF THE INVENTION

The present invention utilizes color maxing theory and a scientific method to adjust color temperatures and to precisely calculate all parameters in a short time. In order to adjust the color temperature of a display, the brightness scale of the R, G, B components needs to be changed. However, for the display itself (especially projection displays), brightness is an important factor in the price of the unit. It is an unsatisfactory option to sacrifice too much brightness to obtain the proper color temperature. Since the chroma presented by a blackbody of a certain temperature is most similar to the sensory response of the human eye, the present invention uses an isotemperature line of related color temperatures with different chroma coordinates and color mixing theory to develop an algorithm that adjusts to a specific color temperature with a minimum loss in brightness. To achieve the above mentioned objective, the memory embodying a program executable by the processor to perform the following method steps, the method of the present invention comprises:

step A: finding coordinates of a brightest color temperature point, wherein the coordinates of the brightest color temperature point are the coordinates on a two dimensional chromaticity diagram;

step B: providing a target isotemperature line on the two dimensional chromaticity diagram; and step C: calculating coordinates of a new color temperature point, wherein:

the coordinates of the new color temperature point are the coordinates on the two dimensional chromaticity diagram;

the new color temperature point is substantially on the target isotemperature line; and the new color temperature point substantially satisfies a condition in which the color display device has the minimum loss of brightness of the red, green and blue components.

The state where the color display device has the minimum loss of brightness of the red, green and blue components indicates that substantially only the brightness of one of the components is reduced.

The method of the present invention can be used in a device for obtaining a new color temperature point. Such a device comprises: a signal generator, a light sensor, a color analyzer and a computer. The computer has a processor and a memory, and the memory comprises a software for enabling the processor to achieve the above-mentioned steps A~C.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
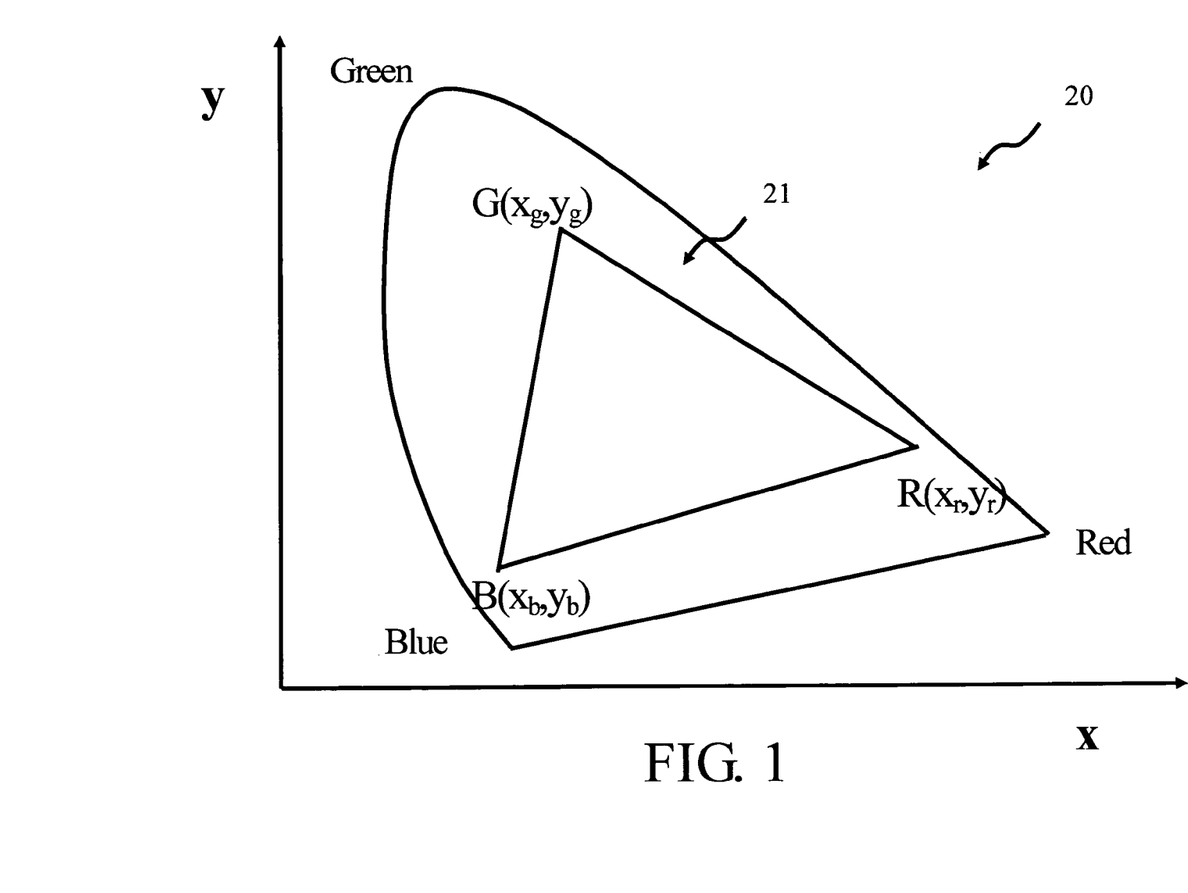
FIG. 1 is a schematic drawing showing red, green and blue vertex coordinates on a two dimensional chromaticity diagram according to the present invention.

Please refer to FIG. 1. FIG. 1 is a schematic drawing showing red, green and blue vertex coordinates on a two dimensional chromaticity diagram according to the present invention. The two dimensional chromaticity diagram 20 may be a standard CIE chromaticity diagram using two coordinates (such as x, y coordinates), and which is used for describing and displaying different colors with a color indicating area 21.

In FIG. 1, chroma coordinates of R, G, and B at a brightest state on a color display device are respectively defined as red vertex coordinates $R(x_r, y_r)$, green vertex coordinates $G(x_g, y_g)$ and blue vertex coordinates $B(x_b, y_b)$. The color display device can be a computer display or a TV screen, and the display type may be a cathode ray tube (CRT) display, an LED display, a projection display, etc.

Figure 2:
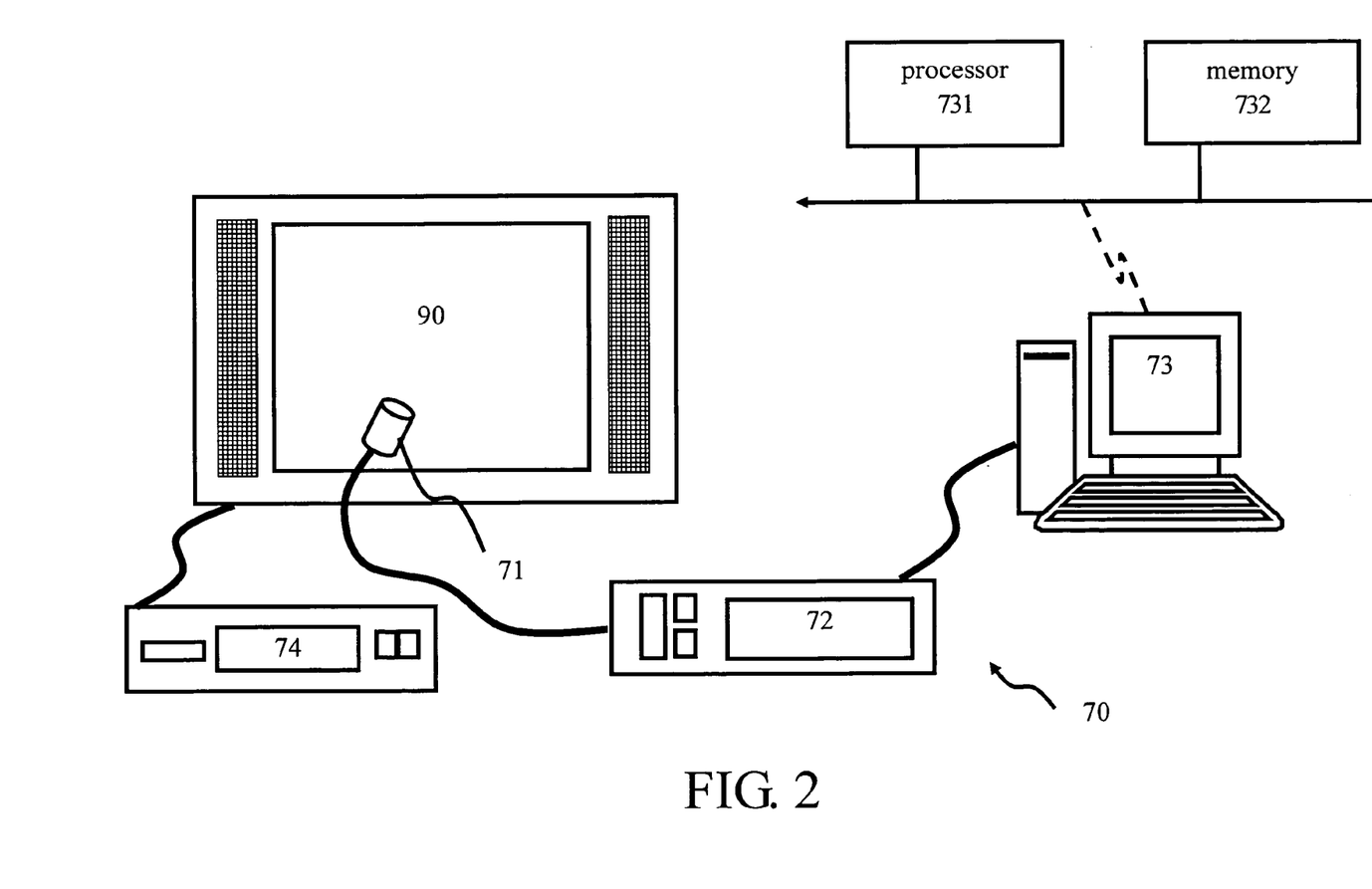
FIG. 2 is a schematic drawing of a setup for obtaining a color temperature point according to the present invention.

FIG. 2 is a schematic drawing showing a device for obtaining a color temperature point according to the present invention. A device 70 for obtaining a color temperature point comprises a light sensor 71, a color analyzer 72, a computer 73 and a signal generator 74. The signal generator 74 is used to generate specific patterns for input into the color display device 90; the light sensor 71 is used to extract images on the color display device 90, and the color analyzer 72 obtains the image of the color display device 90 and measures color information from the image (including, for example, color temperature, brightness and chroma of each gray scale) of the color display device 90 and sends the color information to the computer 73 for analysis. The computer 73 loads the operational results from an operation of a maximum brightness color temperature algorithm into a look up table (LUT) on the color display device 90, so that the color temperature and gamma of the color display device 90 are changed. Since the light sensor 71, the color analyzer 72, the computer 73 (comprising a processor 731 and a memory 732) and the signal generator 74 are all well known hardware devices, they require no further detailed description. The following description concerns the operation of the maximum brightness color temperature algorithm operation.

In the color display device 90, color temperature is defined as a value measured by the color analyzer 72 after the light sensor 71 has extracted an image from the color display device 90 from a completely blank picture. A completely blank picture indicates a color obtained by mixing any R, G, B at identical grey scale. However, displays tend to be affected by light leakage at low brightness values, which can cause the color temperature to have an offset. Therefore, to measure the color temperature, the screen is usually adjusted so that the R, G, B values are at maximum brightness to mix a completely blank picture. The chroma coordinates $R(x_r, y_r)$, $G(x_g, y_g)$ and $B(x_b, y_b)$ of the three R, G, B colors with respectively maximum brightness can then be obtained by measurement. The respective maximum brightness values $Y_r$, $Y_g$, $Y_b$ of the R, G, B colors (which are assumed factors) can also be obtained by measurement.

Figure 3:
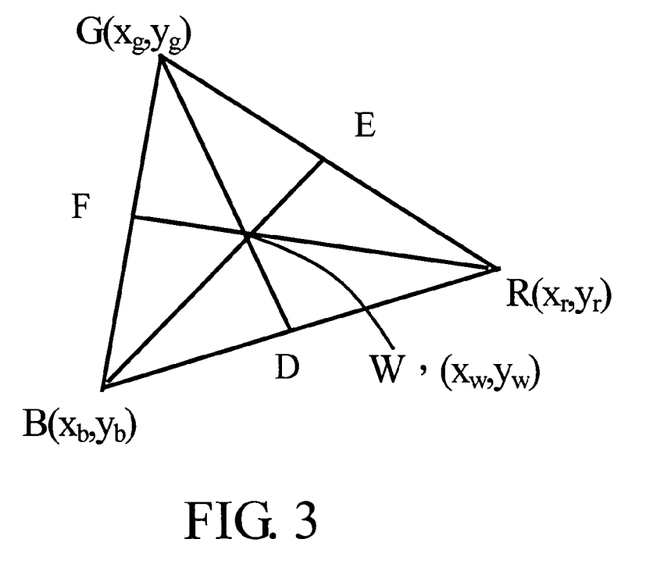
FIG. 3 is a schematic drawing showing a brightest color temperature point according to the present invention.
Figure 4:
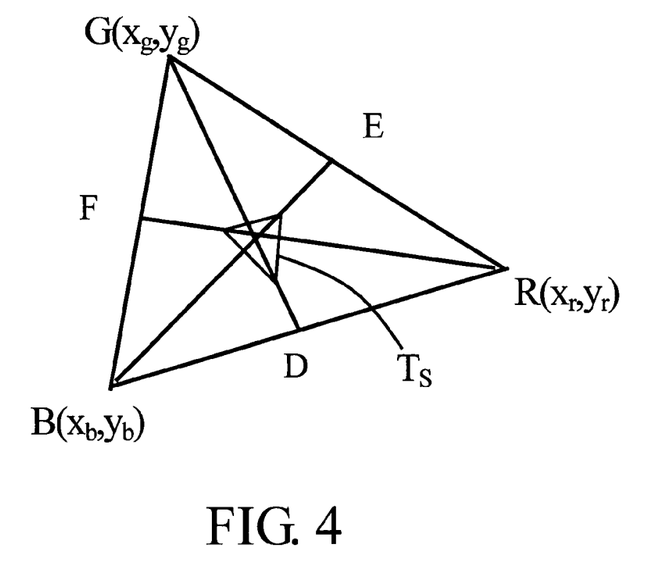
FIG. 4 is a schematic drawing showing brightness loss being controlled in a smaller region according to the present invention.
Figure 5:
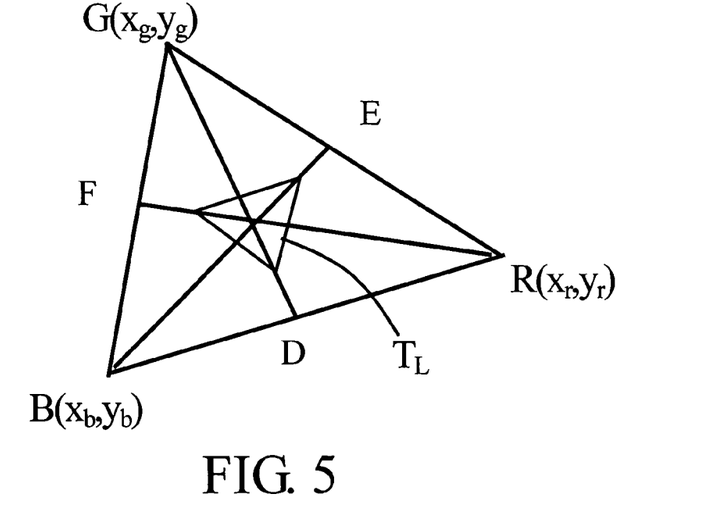
FIG. 5 is a schematic drawing showing brightness loss being controlled in a larger region according to the present invention.

In the following, FIG. 3 to FIG. 5 are used for explaining the basic background theory of the present invention. In order to simplify the drawings, FIGS. 3~5 and FIGS. 7~8 do not show the X, Y axis of the two dimensional chromaticity diagram 20, nor the color indicating area 21 on the two dimensional chromaticity diagram 20.

FIG. 3 is a schematic drawing showing a brightest color temperature point W according to the present invention. In the CIE chroma space, each point represents a different chroma; light mixed from any two lights with different chroma values will have a chroma point located on the line formed by the two chroma points, which is analogous to the center-of-gravity position in physics. As shown in FIG. 3, three points D, E, F are respectively the center of gravity points of line section BR, line section RG, and line section GB, and the three center of gravity lines RF, GD, BE meet at a point W. The chroma coordinates of the three R, G, B colors with respectively maximum brightness are $R(x_r, y_r)$, $G(x_g, y_g)$ and $B(x_b, y_b)$; the W point should be the brightest color temperature point $(x_w, y_w)$.

The brightest color temperature point $(x_w, y_w)$ can be given as:

$$x_w = \frac{m_r x_r + m_g x_g + m_b x_b}{m_r + m_g + m_b} = \frac{\frac{Y_r}{y_r}x_r + \frac{Y_g}{y_g}x_g + \frac{Y_b}{y_b}x_b}{\frac{Y_r}{y_r} + \frac{Y_g}{y_g} + \frac{Y_b}{y_b}} \quad (1)$$

$$y_w = \frac{m_r y_r + m_g y_g + m_b y_b}{m_r + m_g + m_b} = \frac{Y_r + Y_g + Y_b}{\frac{Y_r}{y_r} + \frac{Y_g}{y_g} + \frac{Y_b}{y_b}} \quad (2)$$

from formulas 1 and 2, the following formulas can be obtained:

$$\left(\frac{x_w - x_r}{y_r}\right)Y_r + \left(\frac{x_w - x_g}{y_g}\right)Y_g + \left(\frac{x_w - x_b}{y_b}\right)Y_b = 0 \quad (3)$$

$$\left(\frac{y_w - y_r}{y_r}\right)Y_r + \left(\frac{y_w - y_g}{y_g}\right)Y_g + \left(\frac{y_w - y_b}{y_b}\right)Y_b = 0 \quad (4)$$

By defining:

$$\left(\frac{x_w - x_r}{y_r}\right) = A, \left(\frac{x_w - x_g}{y_g}\right) = B, \left(\frac{x_w - x_b}{y_b}\right) = C,$$

$$\left(\frac{y_w - y_r}{y_r}\right) = D, \left(\frac{y_w - y_g}{y_g}\right) = E, \left(\frac{y_w - y_b}{y_b}\right) = F$$

Formulas 3 and 4 can be changed into:

$$AY_r + BY_g + CY_b = 0 \quad (5)$$

$$DY_r + EY_g + FY_b = \quad (6)$$

Then, the relationship F×(5)−C×(6) yields:

$$\frac{Y_r}{Y_g} = \frac{FB - CE}{CD - FA}$$

$$Y_r : Y_g = \begin{vmatrix} B & C \\ E & F \end{vmatrix} : \begin{vmatrix} C & A \\ F & D \end{vmatrix}$$

$$= \begin{vmatrix} \frac{x_w - x_g}{y_g} & \frac{x_w - x_b}{y_b} \\ \frac{y_w - y_g}{y_g} & \frac{y_w - y_b}{y_b} \end{vmatrix} : \begin{vmatrix} \frac{x_w - x_b}{y_b} & \frac{x_w - x_r}{y_r} \\ \frac{y_w - y_b}{y_b} & \frac{y_w - y_r}{y_r} \end{vmatrix}$$

Similarly, $$Y_r : Y_b = \begin{vmatrix} \frac{x_w - x_g}{y_g} & \frac{x_w - x_b}{y_b} \\ \frac{y_w - y_g}{y_g} & \frac{y_w - y_b}{y_b} \end{vmatrix} : \begin{vmatrix} \frac{x_w - x_r}{y_r} & \frac{x_w - x_g}{y_g} \\ \frac{y_w - y_r}{y_r} & \frac{y_w - y_g}{y_g} \end{vmatrix}$$

In other words, without changing the chroma coordinates of R, G, B, to adjust the color temperature to a specific point (which is $W(x_w, y_w)$), the brightness scale of R, G, B needs to be adjusted to:

$$Y_r : Y_g : Y_b = \quad (7)$$

$$\begin{vmatrix} \frac{x_w - x_g}{y_g} & \frac{x_w - x_b}{y_b} \\ \frac{y_w - y_g}{y_g} & \frac{y_w - y_b}{y_b} \end{vmatrix} : \begin{vmatrix} \frac{x_w - x_b}{y_b} & \frac{x_w - x_r}{y_r} \\ \frac{y_w - y_b}{y_b} & \frac{y_w - y_r}{y_r} \end{vmatrix} : \begin{vmatrix} \frac{x_w - x_r}{y_r} & \frac{x_w - x_g}{y_g} \\ \frac{y_w - y_r}{y_r} & \frac{y_w - y_g}{y_g} \end{vmatrix}$$

For the color display device 90, it is not ideal to sacrifice too much brightness to adjust the color temperature. Therefore, it is important to find a method that causes the minimum amount of brightness to be sacrificed. The method is as follows: the maximum brightness $Y_r$, $Y_g$, $Y_b$ for the R, G, B values of the color display device 90 are individually divided by a brightness scale $Y_{rnew}$, $Y_{gnew}$, $Y_{bnew}$ to obtain a new target color temperature:

$$a_r = \frac{Y_r}{Y_{rnew}}, \ a_g = \frac{Y_g}{Y_{gnew}}, \ a_b = \frac{Y_b}{Y_{bnew}}$$

The smallest one of $a_r$, $a_g$, $a_b$ is the first to achieve the maximum brightness in the adjusted processes; assuming, for example, that the smallest value is $\alpha_{min} = \min(a_r, a_g, a_b)$, then $\alpha_{min}$ multiplied by $Y_{rnew}$, $Y_{gnew}$, $Y_{bnew}$ is used to obtain the adjusted brightness:

$$Y_{r\_tuned} = \alpha_{min} Y_{rnew}$$

$$Y_{g\_tuned} = \alpha_{min} Y_{gnew}$$

$$Y_{b\_tuned} = \alpha_{min} Y_{bnew}$$

The adjusted brightness is the brightness needed by each color to achieve the target color temperature.

One set of R, G, B brightness scales corresponds to one color temperature point. Therefore, by reducing the total brightness, a tolerance value is given for different matches among the R, G, B components, which can obtain many different color temperature points. Based on color mixing theory, a gamut edge $T_s$ can be obtained, as shown in FIG. 4. This gamut edge $T_s$ indicates a color temperature point range obtained by randomly mixing the R, G, B brightness values when the lost brightness does not exceed a predetermined tolerance value. The gamut edge $T_s$ is a triangle formed by three vertices separately located on three center of gravity lines (RF, GD, BE).

If the total brightness is reduced even lower, as shown in FIG. 5, the gamut edge $T_L$ becomes larger.

Figure 6:
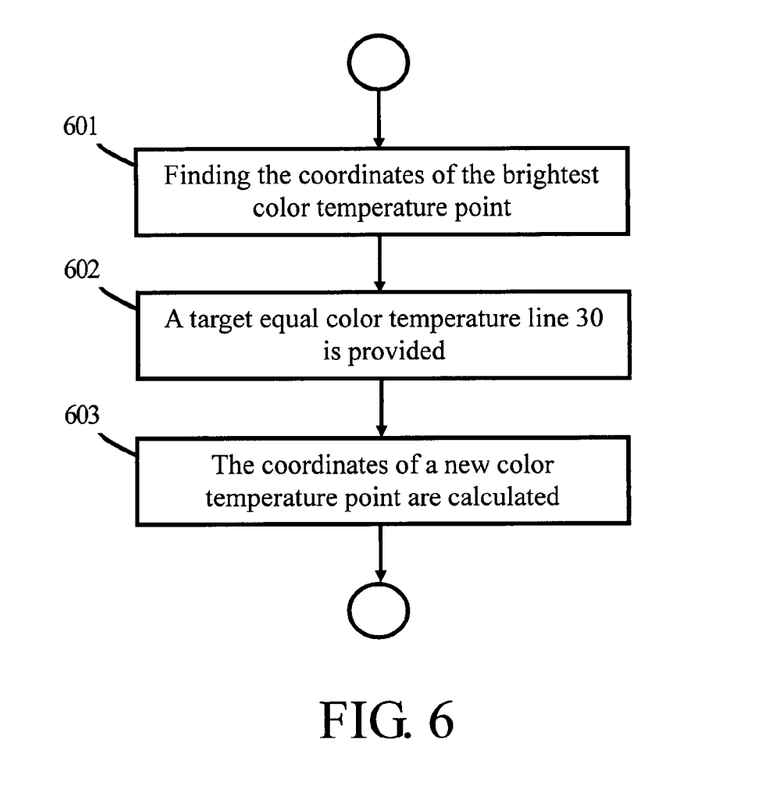
FIG. 6 is a flow chart for obtaining a new color temperature point according to the present invention.

The above description is the theory of the technology of the present invention. Please refer to FIG. 6. FIG. 6 is a flow chart for obtaining a new color temperature point according to the present invention.

Step 601:

Finding the coordinates of the brightest color temperature point W, wherein the coordinates of the brightest color temperature point are the coordinates on a two dimensional chromaticity diagram 20. Step 601 is used for finding the coordinates ($x_w$, $y_w$) of the brightest color temperature point W: $R(x_r, y_r)$, $G(x_g, y_g)$ and $B(x_b, y_b)$.

As shown in FIG. 2, the coordinates ($x_w$, $y_w$) of the brightest color temperature point W and the respectively maximum brightness $Y_r$, $Y_g$, $Y_b$ of the R, G, B components can be obtained from the the light sensor 71 in conjunction with the color analyzer 72 of the measuring device 70.

Figure 7:
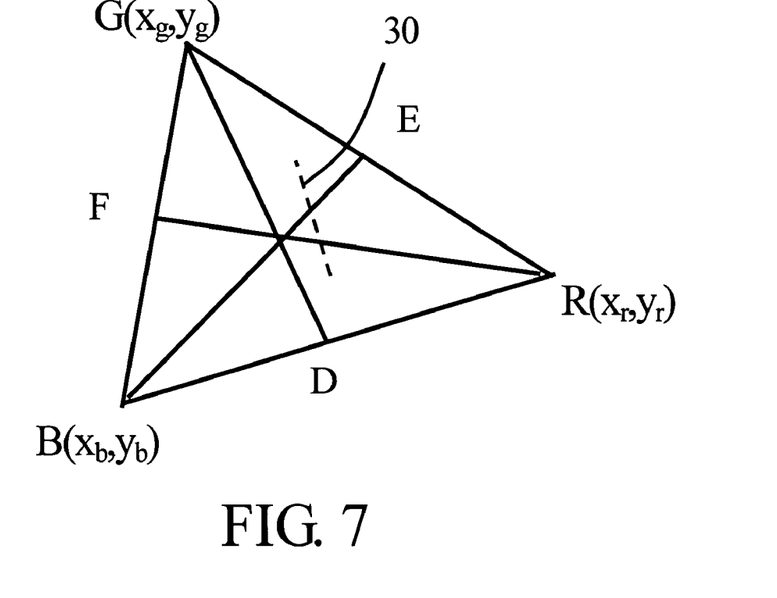
FIG. 7 is a schematic drawing showing a target isotemperature line on a two dimensional chromaticity diagram according to the present invention.

Step 602:

A target isotemperature line 30 is provided on the two dimensional chromaticity diagram 20. With reference to FIG. 7, the target isotemperature line 30 is based upon market requirements; for example, Asians tend to prefer warm colors, while Europeans tend to prefer cold colors; therefore, for users in different countries, some color temperature adjustments may be needed.

Figure 8:
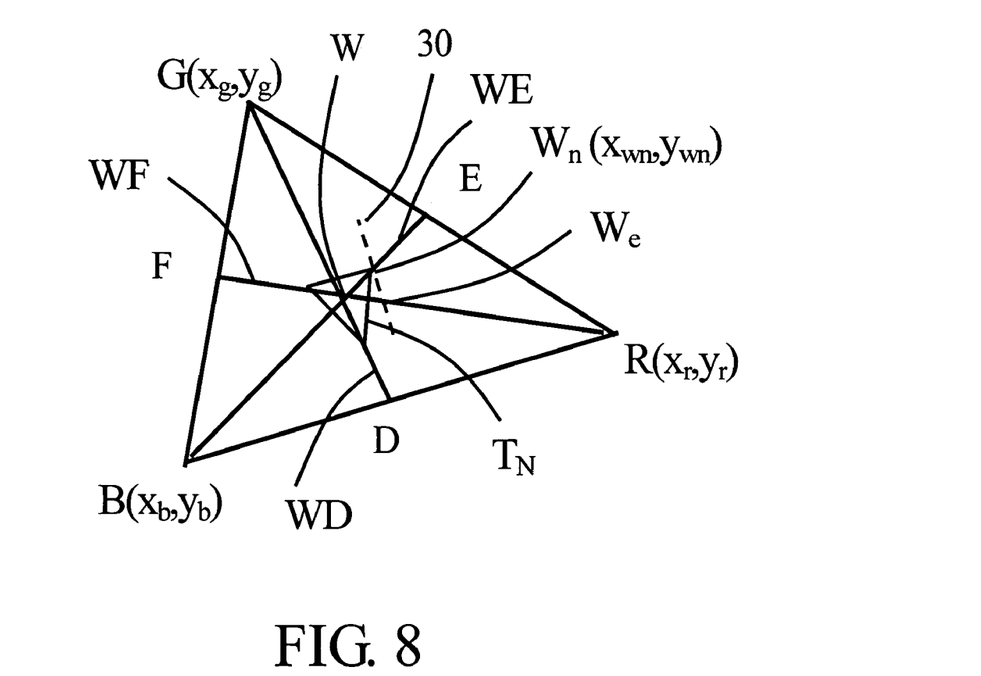
FIG. 8 is a schematic drawing showing a new color temperature point according to the present invention.

Step 603:

The coordinates ($x_{wn}$, $y_{wn}$) of a new color temperature point $W_n$ are calculated. With the target isotemperature line 30, a gamut edge $T_N$ with a minimum brightness loss can be found. The new color temperature point $W_n$ is located on the target isotemperature line. Since the gamut edge $T_N$ satisfies minimum brightness loss, the gamut edge $T_N$ should be a smallest triangle, with the new color temperature point $W_n$ substantially located in the triangular vertices of the gamut edge $T_N$.

As mentioned in the above theory, the gamut edge $T_N$ is a triangle composed of three vertices, each located on the three center of gravity lines (RF, GD, BE). An intersection point between the target isotemperature line 30 and three center of gravity lines (RF, GD, BE) is therefore the new color temperature point $W_n$.

However, there is another intersection point $W_e$ between the target isotemperature line 30 and the three center of gravity lines, but the intersection point $W_e$ is not located on the gamut edge $T_N$, and so the intersection point $W_e$ is not the new color temperature point. The following description provides a more detailed explanation.

The intersection point of the target isotemperature line 30 and the red brightness reducing line WF, the green brightness reducing line WD and the blue brightness reducing line WE is the new color temperature point $W_n$; wherein the red brightness reducing line WF is a line section from the brightest color temperature point W to point F;

the green brightness reducing line WD is a line section from the brightest color temperature point W to point D; and the blue brightness reducing line WE is a line section from the the brightest color temperature point W to point E.

It is relatively easy to calculate the new color temperature point $W_n$. First, the red, green and blue brightness reducing lines WF, WD, WE can be obtained by the equations, and then further used to obtain the equation for the target isotemperature line 30 (or the coordinates of the target isotemperature line 30) to calculate the new color temperature point $W_n$. Since the calculations for the line sections and the intersection points are basic math, there is no need for further explanation.

The above-mentioned processes for calculation or data processing and recording can be performed by the computer 73 of the device 70 with the memory embodying a program executable by the processor to perform the above methods.

Additionally, though "gamut edge" theory is indicated, it is actually not necessary to utilize the triangulating technology of the "gamut edge", because step 603 is faster.

Also, the coordinates $(x_{wn}, y_{wn})$ of the new color temperature point provide the best solution for the minimum amount of brightness loss; however, the present invention also includes the ability to find the second-best solution around the coordinates of the new color temperature point.

Although the present invention has been explained in relation to its preferred embodiment, it is to be understood that many other possible modifications and variations can be made without departing from the spirit and scope of the invention as hereinafter claimed.

What is claimed is:

1. A method of obtaining a new color temperature point on a color display device, the color display device providing red, green and blue light, wherein a brightest temperature point Wn is formed when the red, green, and blue light are all under a brightest state; the method comprising:

step A: finding coordinates $(x_w, y_w)$ of a brightest color temperature point, wherein the coordinates $(x_w, y_w)$ of the brightest color temperature point are the coordinates on a two dimensional chromaticity diagram;

step B: providing a target isotemperature line on the two dimensional chromaticity diagram; and step C: calculating coordinates $(x_{wn}, y_{wn})$ of a new color temperature point $W_n$ wherein:

the coordinates $(x_{wn}, y_{wn})$ of the new color temperature point $W_n$ are the coordinates on the two dimensional chromaticity diagram;

the new color temperature point $W_n$ is substantially on the target isotemperature line; and the new color temperature point $W_n$ substantially satisfies a condition in which the color display device has the minimum loss of brightness of the red, green and blue components.

2. The method of obtaining a new color temperature point as claimed in claim 1, wherein step A further comprises:

finding three vertex coordinates of the two dimensional chromaticity diagram on the color display device when red, green and blue components are all in the brightest state; the three vertex coordinates being respectively defined as red vertex coordinates, green vertex coordinates and blue vertex coordinates; and calculating coordinates of the brightest color temperature point, wherein the coordinates of the brightest color temperature point are center of gravity point coordinates of the three vertex coordinates.

3. The method of obtaining a new color temperature point as claimed in claim 2, wherein step C further comprises:

calculating a red brightness reducing line passing through the red vertex coordinates and the coordinates of the brightest color temperature point; wherein the red brightness reducing line is a straight line, and the red brightness of any point on the red brightness reducing line is less than the red brightness of the brightest color temperature point;

calculating a green brightness reducing line passing through the green vertex coordinates and the coordinates the brightest color temperature point; wherein the green brightness reducing line is a straight line and the green brightness of any point on the green brightness reducing line is less than the green brightness of the brightest color temperature point;

calculating a blue brightness reducing line passing through the blue vertex coordinates and the coordinates the brightest color temperature point; wherein the blue brightness reducing line is a straight line and the blue brightness of any point on the blue brightness reducing line is less than the blue brightness of the brightest color temperature point; and calculating coordinates of the new color temperature point; wherein the new color temperature point is an intersection point of the target isotemperature line, the red brightness reducing line, the green brightness reducing line and the blue light reducing line.

4. The method of obtaining a new color temperature point as claimed in claim 3, wherein in step C, the state where the color display device has the minimum loss of brightness of the red, green and blue components indicates that only the brightness of one of the components is reduced.

5. The method of obtaining a new color temperature point as claimed in claim 4, wherein the two dimensional chromaticity diagram is a CIE chromaticity diagram.

6. The method of obtaining a new color temperature point as claimed in claim 1, wherein the two dimensional chromaticity diagram is a CIE chromaticity diagram.

7. The method of obtaining a new color temperature point as claimed in claim 1, wherein in step C, the state in which the color display device has the minimum loss of brightness of the red, green and blue components indicates that only the brightness of one of the components is reduced.

8. A device for obtaining a new color temperature point on a color display device, the color display device providing red, green and blue components, wherein a brightest temperature point $W_n$ is formed when the red, green, and blue components are all in a brightest state; the device comprising:

a signal generator for generating specific patterns to input into the color display device;

a light sensor for sensing images on the color display device;

a color analyzer connected to the light sensor to obtain the image of the color display device and to measure color information of the color display device;

a computer connected to the color analyzer to obtain the color information of the color display device, the computer having a processor and a memory, the memory embodying a program executable by the processor to perform the following method steps:

step A: finding coordinates $(x_w, y_w)$ of a brightest color temperature point, wherein the coordinates $(x_w, y_w)$ of the brightest color temperature point are the coordinates on a two dimensional chromaticity diagram;

step B: providing a target isotemperature line on the two dimensional chromaticity diagram; and step C: calculating coordinates ($x_{wn}$, $y_{wn}$) of a new color temperature point $W_n$, wherein:
  the coordinates ($x_{wn}$, $y_{wn}$) of the new color temperature point $W_n$ are coordinates on the two dimensional chromaticity diagram;
  the new color temperature point $W_n$ is substantially on the target isotemperature line; and
  the new color temperature point $W_n$ substantially satisfies a state in which the color display device has a minimum loss of brightness of the red, green and blue components.

9. The device for obtaining a new color temperature point as claimed in claim 8, wherein step A further comprises:
  finding three vertex coordinates of the two dimensional chromaticity diagram on the color display device when the red, green and blue components are all in the brightest state; the three vertex coordinates being respectively defined as red vertex coordinates, green vertex coordinates and blue vertex coordinates; and
  calculating coordinates of the brightest color temperature point, wherein the coordinates of the brightest color temperature point are center of gravity point coordinates of the three vertex coordinates.

10. The device for obtaining a new color temperature point as claimed in claim 9, wherein step C further comprises:
  calculating a red brightness reducing line passing through the red vertex coordinates and the coordinates of the brightest color temperature point; wherein the red brightness reducing line is a straight line and the red brightness of any point on the red brightness reducing line is less than the red brightness of the brightest color temperature point;
  calculating a green brightness reducing line passing through the green vertex coordinates and the coordinates of the brightest color temperature point; wherein the green brightness reducing line is a straight line and the green brightness of any point on the green brightness reducing line is less than the green brightness of the brightest color temperature point;
  calculating a blue brightness reducing line passing through the blue vertex coordinates and the coordinates of the brightest color temperature point; wherein the blue brightness reducing line is a straight line and the blue brightness of any point on the blue brightness reducing line is less than the blue brightness of the brightest color temperature point; and
  calculating coordinates of the new color temperature point; wherein the new color temperature point is an intersection point of the target isotemperature line, the red brightness reducing line, the green brightness reducing line and the blue brightness reducing line.

11. The device of obtaining a new color temperature point as claimed in claim 10, wherein in step C, the state where the color display device has the minimum loss of brightness of the red, green and blue components indicates that only the brightness of one of the components is reduced.

12. The device for obtaining a new color temperature point as claimed in claim 11, wherein the two dimensional chromaticity diagram is a CIE chromaticity diagram.

13. The device for obtaining a new color temperature point as claimed in claim 8, wherein the two dimensional chromaticity diagram is a CIE chromaticity diagram.

14. The device for obtaining a new color temperature point as claimed in claim 8, wherein in step C, the state in which the color display device has the minimum loss of brightness of the red, green and blue components indicates that only the brightness of one of the components is reduced.

* * * * *